JOHN HUGHES.
Improvement in Processes for Utilizing Immature Cotton-Bolls.
No. 115,209.   Patented May 23, 1871.
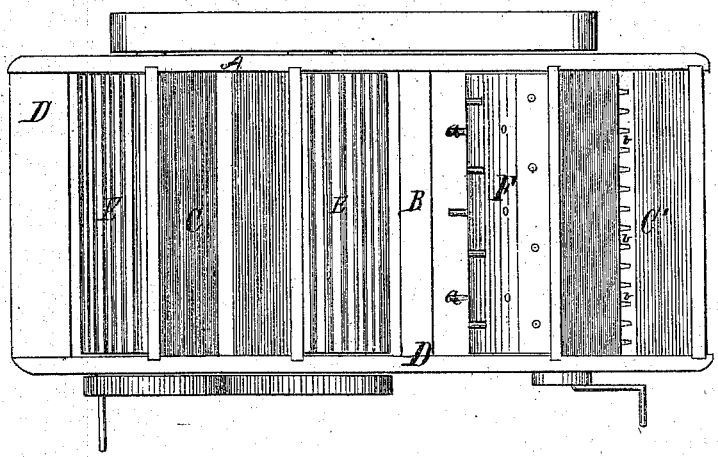
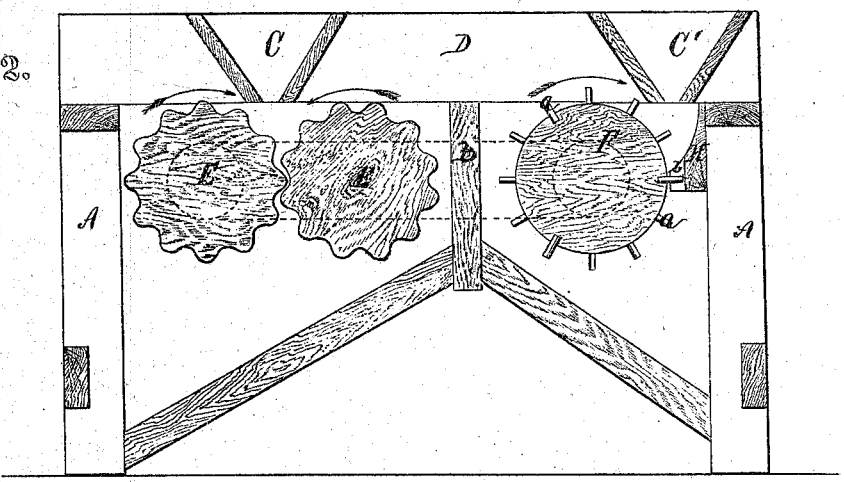

115,209

UNITED STATES PATENT OFFICE.

JOHN HUGHES, OF NEW BERNE, NORTH CAROLINA.

IMPROVEMENT IN PROCESSES FOR UTILIZING IMMATURE COTTON-BOLLS.

Specification forming part of Letters Patent No. 115,209, dated May 23, 1871.

*To all whom it may concern:*

Be it known that I, JOHN HUGHES, of New Berne, in the county of Craven and State of North Carolina, have invented a new and valuable Improvement in Utilizing Immatured Cotton-Bolls; and I do hereby declare that the following is a full, clear, and exact description of the construction and operation of the same, reference being had to the annexed drawing making a part of this specification, and to the letters and figures of reference marked thereon.

Figure 1 of the drawing is my invention in plan view. Fig. 2 is a central vertical section of the same.

My invention has relation to means for utilizing the contents of the immatured bolls of cotton which are late in coming to perfection, and are therefore unopened when the mass of the cotton is picked; and it consists in the construction of suitable machinery whereby the said unripened cotton-bolls may be artificially opened and the cotton combed and spread in such a manner that it may be readily dried and ginned out.

The letter A of the drawing designates the box-like frame of my machine. This frame is divided in two portions by the vertical transverse partition B. C C′ represent the hopper, transversely placed in a rectangular removable frame, D. E E represent the rollers, by the operation of which the bolls are opened. These are usually corrugated, and are designed to rotate toward each other in the direction indicated by the arrows in the drawing. F designates the spreading-roller. This roller is provided with the teeth *a a*, which pass between the teeth *b b* of the comb H attached to the frame-work A. The comb H is curved downward and inward toward the roller F, thus guiding the contents of the hopper C′ in the proper direction to be acted on by the intercalating teeth of the roller F and comb H.

The rollers may be operated by horse-power or steam. The unopened bolls, having been placed in the hopper C, are fed to the rollers E E, between which they pass. The rollers E E are placed sufficiently close together to squeeze the bolls as they pass between, causing them to fly open. The cotton will be found in the boll packed in lobes, like the divisions of an orange. These little lobes are now to be taken out of the boll and placed in the hopper C′, by which they are fed to the spreader and comb. The teeth of the spreading-roller F catch the packed lobes of cotton and press them between the teeth of the comb H in such a manner as to tear them, spreading and loosening up the fibers, so that the cotton may be afterward readily dried and ginned out.

What I claim as new, and desire to secure by Letters Patent, is—

The process herein described of opening the immature cotton-bolls and preparing the cotton-lobes for ginning, substantially as and by the mechanism specified.

In testimony that I claim the above I have hereunto subscribed my name in the presence of two witnesses.

JNO. HUGHES.

Witnesses:
 M. D. W. STEVENSON,
 WM. H. COOKE.